United States Patent [19]

Williams

[11] Patent Number: 4,512,723
[45] Date of Patent: Apr. 23, 1985

[54] PRESSURE LIMITER

[75] Inventor: Keith R. Williams, Nevada, Iowa

[73] Assignee: Sundstrand Corporation, Rockford, Ill.

[21] Appl. No.: 542,493

[22] Filed: Oct. 17, 1983

[51] Int. Cl.³ .............................................. F04B 49/00
[52] U.S. Cl. ..................... 417/222; 60/444; 60/452
[58] Field of Search ............ 417/217, 218, 222; 251/43, 25; 137/529, 538; 60/443, 444, 452, 445

[56] References Cited

U.S. PATENT DOCUMENTS

| | | | |
|---|---|---|---|
| 1,623,431 | 4/1927 | McVoy | 137/529 |
| 1,974,138 | 9/1934 | Ferris et al. | 417/217 |
| 2,944,564 | 7/1960 | Pettey | 137/529 |
| 3,017,897 | 1/1962 | Seguenot | 137/529 |
| 3,553,962 | 1/1971 | Potter et al. | 60/19 |
| 3,585,797 | 6/1971 | Moon | 60/444 |
| 3,637,327 | 1/1972 | Kubiak | 417/222 |
| 3,659,963 | 5/1972 | Jennings | 417/213 |
| 4,116,587 | 9/1978 | Liesener | 417/212 |
| 4,212,164 | 7/1980 | Young | 60/452 |
| 4,336,003 | 6/1982 | Kramer et al. | 417/217 |
| 4,414,882 | 11/1983 | Frei | 251/25 X |

FOREIGN PATENT DOCUMENTS

39725  11/1971  Japan .................... 417/274

OTHER PUBLICATIONS

Drawing of Hydraulics Inc. bearing a date 1-28-77.

Primary Examiner—Edward K. Look
Attorney, Agent, or Firm—Wood, Dalton, Phillips, Mason, & Rowe

[57] ABSTRACT

A pressure limiter for a variable displacement pump of a hydrostatic transmission and which is remotely variable and operable to reduce pump stroke when a system pressure limit is exceeded to limit torque applied to an output shaft of the transmission. The pressure limiter has a valve with a valve member which senses system pressure and when system pressure exceeds a certain value the valve member operates to direct system pressure to a servo cylinder for the variable displacement pump to move the swashplate of the pump in a destroking direction. The pressure limiter valve has a spring acting on the valve member in a direction opposite to the force of system pressure and a piston is associated with the spring. A remotely set variable control pressure can be applied to the piston to vary the effective force of the spring and value of system pressure at which the pressure limiter valve will open to destroke the pump. Alternate embodiments provide for an absence of control pressure either establishing a minimum or maximum setting at which system pressure will be operative to open the pressure limiter valve.

3 Claims, 2 Drawing Figures

PRESSURE LIMITER

DESCRIPTION

Technical Field

This invention pertains to a pressure limiter associated with a variable displacement pump for reducing the pump displacement when a pressure limit for the pump discharge pressure is exceeded. More particularly, the pressure limiter has a variable pressure setting to vary the pressure set point at which the pump will be destroked and the setting can be established from a remote location as by an operator at a control station.

Background Art

Hydrostatic transmissions having at least one variable displacement pump in closed circuit with the motor are used to drive many different devices including oil drilling equipment. In such uses, there is a need for an automatic torque limiting control and a pressure limiter achieves this function by reducing the stroke of the variable displacement pump when the pressure limit is exceeded, thereby limiting torque applied to the drive shaft of the equipment.

In order to achieve a fast response in destroking of the pump, it is known to directly connect oil at system pressure to the displacement control means of the variable displacement pump, as distinct from using oil at charge pressure. The latter is derived from a charge pump which is a component of a hydrostatic transmission and which normally operates to supply makeup fluid to the closed fluid loop of the transmission and to supply fluid to other control mechanisms, such as the displacement control.

In one prior device of this type, the normal fluid communication between a displacement control valve and a pair of servo cylinders associated with the variable displacement pump has been blocked and fluid communication therebetween is achieved by connections to a pressure limiter valve which also has a connection to the variable displacement pump discharge. This results in three lines extending to the pressure limiter valve with a fluid pressure set by the displacement control valve directed to a pump servo cylinder through the pressure limiter valve and, when pump discharge pressure exceeds a predetermined set point, the valve member of the pressure limiter valve shifts to permit system pressure to be directed to a servo cylinder. In this prior art device, there has been no provision for remotely varying the set point at which the pressure limiter valve will open and, therefore, it has not been possible to vary the system torque limit for different load conditions.

The Ferris et al Pat. No. 1,974,138 has a pressure limiter valve for directing oil at system pressure to a pump servo cylinder in a circuit arrangement which is dependent on the position of the displacement control valve.

It is also known in the prior art to have a crane swing control wherein maximum pump pressure can be limited by use of a valve which has a variable set point, with such a control being shown in Kramer et al Pat. No. 4,336,003.

Disclosure of the Invention

A primary feature of the invention is to provide a new and improved pressure limiter utilizing a valve of a simpler construction than previously known to reduce the number of lines for placing the pressure limiter valve in communication with the associated structure and wherein a pump servo cylinder is in constant fluid communication with case pressure through an orifice.

Another feature of the invention is to provide a remotely variable pressure limiter operable to reduce the stroke of a variable displacement pump when a pressure limit for pump discharge pressure is exceeded to thereby limit torque applied to a member driven by a motor in fluid communication with the pump and with the variable pressure limiter having means enabling adjustment of the pressure limit from a remote location and thereby facilitating a variation in the torque limit for different load conditions.

More particularly, a feature of the invention is to provide a remotely variable pressure limiter for a variable displacement pump which, as part of a hydrostatic transmission, is in closed circuit with a motor used to drive a member, such as a drive shaft of oil drilling equipment or other structure, such as a crane winch, and with the remotely variable pressure limiter having means subject to adjustment from a remote location whereby the limit of the pump discharge pressure may be varied and, thus, the torque limit can be varied for different load conditions.

An object of the invention is to provide a pressure limiter for a variable displacement pump having an adjustable swashplate and constructed to have pressure moments urging the swashplate in a pump destroking direction, comprising, a pair of servo cylinders connected to said swashplate with one servo cylinder including a spring acting to urge the swashplate in the pump destroking direction, a displacement control valve having a pair of connections one to each of said servo cylinders, one of said connections providing connection of said one servo cylinder to a reduced case pressure through an orifice and the other connection providing for delivery of a displacement-setting pressure to the other of said servo cylinders, and a pressure limiter valve for selectively connecting pump discharge pressure to said one servo cylinder to move the swashplate in a displacement reducing direction and having a movable valve member, said pressure limiter valve having a valve chamber with only two fluid lines connected thereto with a first fluid connection to a pump outlet and a second fluid connection to said one servo cylinder, said movable valve member controlling communication between said fluid connections and being positionable in response to the value of the pump discharge pressure.

Another object of the invention is to provide a remotely variable pressure limiter for a variable displacement pump having an adjustable swashplate and constructed to have pressure moments urging the swashplate in a pump destroking direction, comprising, a pair of servo cylinders connected to said swashplate with one servo cylinder including a spring acting to urge the swashplate in the pump destroking direction, a displacement control valve having a pair of connections one to each of said servo cylinders, one of said connections providing connection of said one servo cylinder to a reduced case pressure through an orifice and the other connection providing for delivery of a displacement-setting pressure to the other of said servo cylinders, a pressure limiter valve for selectively connecting pump discharge pressure to said one servo cylinder to move the swashplate in a displacement reducing direction and having a movable valve member which moves from a first position to make said connection and which is urged away from said first position by pump discharge pressure, and means for remotely setting the value of the discharge pressure which will move the valve member including a spring acting on the valve member, and a piston engaging said spring and acted upon by a remotely set control pressure to vary the force required to move the valve member.

Best Mode for Carrying Out the Invention

Figure 1:
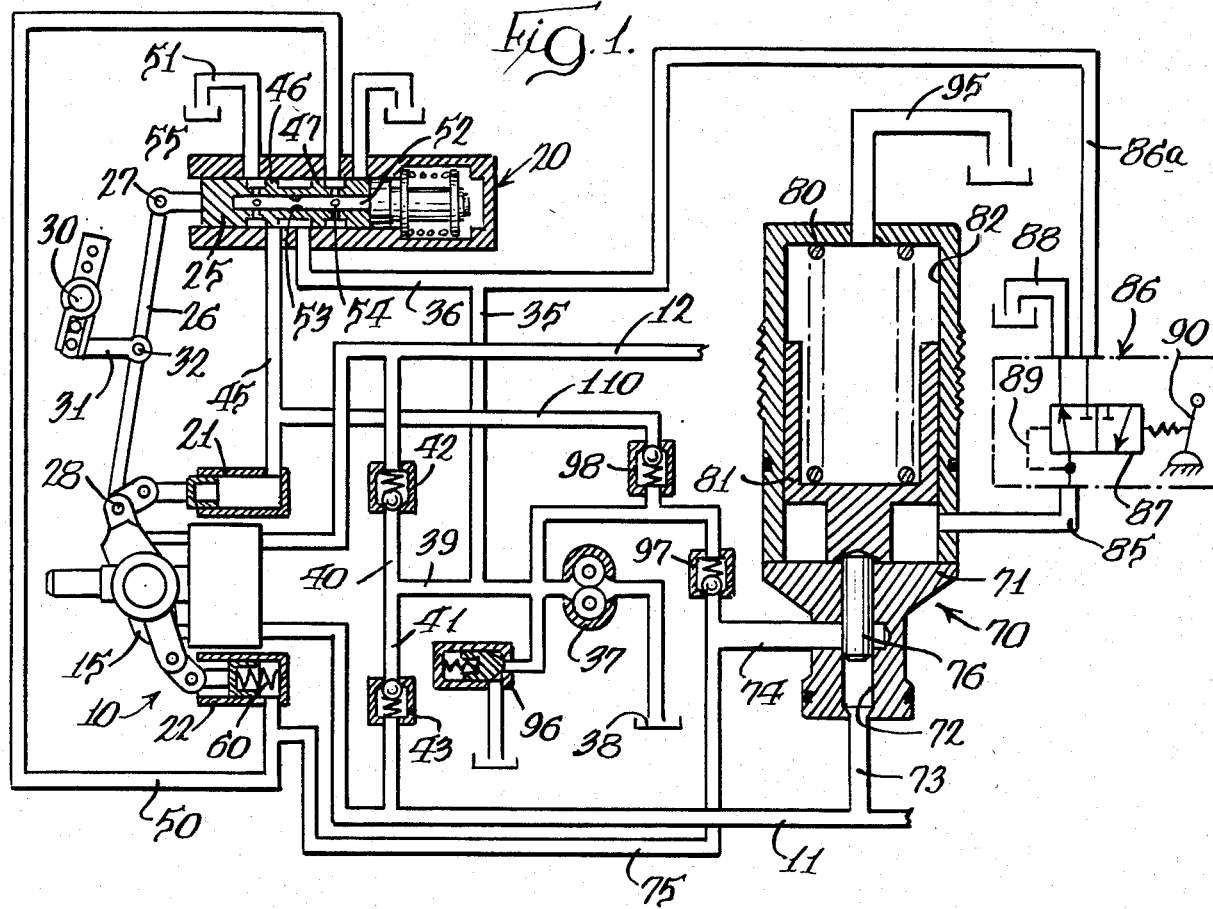
FIG. 1 is a schematic of a portion of a hydrostatic transmission, with the remotely variable pressure limiter shown in association therewith and with parts of the pressure limiter valve shown in central section.

A hydrostatic transmission has a pair of fluid displacement units in closed circuit with each other with one, or both, of these units being of variable displacement. When power flow between the units is always from one unit to the other, one unit is a pump and the other is a motor. A portion of the hydrostatic transmission is shown in FIG. 1 wherein a variable displacement pump, indicated generally at 10, is in a closed loop fluid circuit with a fluid motor (not shown) through a pair of lines 11 and 12. With the components of the pump 10 positioned as shown in FIG. 1, operation of the pump results in pump discharge pressure existing in line 11 and return flow from the motor flowing to the pump through line 12.

The variable displacement pump 10 is generally of a conventional construction wherein a plurality of movable pistons are mounted within a rotatable cylinder block and are caused to stroke axially of the cylinder block by means of a swashplate 15. The position of the swashplate can be varied about a rotational axis to vary the stroke of the pistons and, thus, the displacement of the pump.

The position of the swashplate 15 and, therefore, the displacement of the pump is under the control of a displacement control including a displacement control valve, indicated generally at 20, and a pair of servo cylinders 21 and 22. The displacement control valve 20 has a displacement control valve member 25 pivotally connected to a link 26 at 27. The link 26 is pivotally connected at 28 to the swashplate. The displacement of the pump is set by a rotatable member 30 which can be manually rotated and which is connected by a link 31 to the link 26 intermediate its ends by a pivot connection 32. Operation of the rotatable member 30 causes a pivoting of the link 26 about the pivot 28 to position the displacement control valve member 25 and, thus, control delivery of charge pressure to the servo cylinder 21.

The displacement control valve 20 is supplied with oil at charge pressure through lines 35 and 36 which extend between the displacement control valve and a charge pump 37 which has an inlet connected to tank 38. The charge pump also provides make-up fluid to the lines 11 and 12 by connection thereto through lines 39, 40 and 41, with the lines 40 and 41 each having a check valve 42 and 43, respectively, for preventing reverse flow in a direction toward the charge pump.

As seen in FIG. 1, oil at a displacement-setting pressure established by the displacement control valve 20 communicates with the servo cylinder 21 through a line 45 extending from the displacement control valve, with the valve member 25 having a pair of lands 46 and 47 controlling this communication.

A line 50 connects the servo cylinder 22 to the displacement control valve and the servo cylinder 22 is connected to case pressure by a line 51 which communicates with a bore 52 in the valve member having an orifice 53 therein. This communication with respect to the bore 52 is through a series of radial ports 54 and 55 which extend between annular grooves of the valve member and the bore 52.

The variable displacement pump 10 is constructed whereby, in operation, pressure moments within the pump act to urge the swashplate 15 in a clockwise direction, as viewed in FIG. 1, to destroke the pump. An additional force urging the swashplate 15 in a destroking direction, is a spring 60 in the servo cylinder 22. Thus, the displacement of the pump 10 is set by the value of the pressure directed to the servo cylinder 21 through the displacement control valve 20 which acts in opposition to the pressure moments and the spring 60. The link 26 functions as a feedback link to feed back the position of the swashplate 15 to the displacement control valve member 25.

In order to limit torque, a pressure limiter is associated with the hydrostatic transmission and comprises a pressure limiter valve, indicated generally at 70. The pressure limiter valve 70 has a body 71 with a valve chamber 72. There are only two lines connected to the valve chamber 72, with a first line 73 connecting the valve chamber to the line 11 of the closed loop whereby system pressure is delivered to the valve chamber. The other line 74 communicates with the servo cylinder 22 through a line 75. A valve member 76 positioned in the valve chamber, has a first position, as seen in FIG. 1, in which communication between lines 73 and 74 is blocked. When the valve member 76 moves upwardly, as seen in FIG. 1, a certain distance from the position shown, communication between these lines will be unblocked and system pressure can be directed from line 73 to line 74 and, thus, directed to the servo cylinder 22.

The pressure limiter valve includes a spring acting on a piston or plunger 81 which engages an end of the valve member 76. The force of the spring 80 acting on the valve member 76 determines the set point at which the pump discharge pressure will be of a value to shift the valve member 76 to a position to place lines 73 and 74 in communication. The set point is variable by varying the effective force of the spring. This is accomplished by means for directing a control pressure into a chamber 82 in which the piston 81 is movable. This control pressure is directed to the underside of the piston 81 through a line 85. This line can extend to a control station remote from the hydrostatic transmission, with such control station being indicated generally at 86. This control station receives charge pressure through a line 86a which connects to the charge pressure line 35 and with this charge pressure being directed to a valve, shown diagrammatically at 87. This valve is positionable to establish a control pressure applied to the underside of the piston 81 through the line 85 and includes a line 88 connected to drain. The control pressure is fed back to the valve at 89.

The valve 87 can be positioned by means of a control handle 90.

When there is no control pressure in line 85, the force of the spring 80 is at a maximum and there is a maximum pressure setting. When a control pressure is delivered to the chamber 82, the pressure acts against the force of the spring 80 to reduce the pressure set point at which the valve member will move from the blocking position of FIG. 1. The control pressure is variable and, as the value thereof increases, the set point at which the pump discharge pressure will operate the valve member 76 decreases.

A line 95 provides for delivering any fluid leaking past the piston 81 to drain.

A relief valve 96 limits maximum charge pump pressure. A check valve 97 operates to prevent the pressure in servo cylinder 22 exceeding charge pressure. A check valve 98 in line 110 connected to line 45 provides a means of flowing oil rapidly from the servo cylinder 21 to give fast response in reducing pump displacement when the pressure limiter valve opens communication between lines 73 and 74.

With the hydrostatic transmission in operation, system pressure exists in line 11 of the closed loop, with this pressure being applied to an end of the valve member 76 which functions as a sensing piston. Assuming there is no control pressure within the chamber 82, when system pressure exceeds the force of the spring 80 sufficient to connect the lines 73 and 74 by upward movement of the valve member 76, oil at system pressure, as limited by check valve 97, is directed to the servo cylinder 22 and the swashplate 15 moves in a pump destroking direction. The displacement control tries to maintain the commanded stroke position established by operation of the member 30 by porting charge pressure to the servo cylinder 21, but the servo pressure differential is too small to overcome the force of the spring 60 in the servo cylinder 22 and the pressure moments within the pump. During this movement of the swashplate 15, oil flows from the servo cylinder 21 through the check valve 98.

As the pump destrokes, the pump flow decreases, lowering the pressure in the line 11 of the closed loop to the pressure limiter setting. The valve member 76 then closes off communication between lines 73 and 74 to maintain the pump position required to maintain the pressure limiter setting. From the foregoing, it will be seen that the effective force of the spring 80 and the area of the sensing piston end of the valve member 76 determine the pressure limiter setting. When there is a maximum load condition imposed on the hydrostatic transmission and there is to be the highest torque limit, there will be no control pressure acting on the piston 81 so that the force of the spring 80 is fully effective to set a maximum value for system pressure.

If the displacement control valve member 25 is operated through the link 26 to increase the displacement of the pump by moving the swashplate 15 in a counter-clockwise direction, there must be oil flow from the servo cylinder 22 which is permitted by flow through the line 50 and the orifice 53 within the displacement control valve member 25. The orifice 53 limits flow to case pressure when system pressure is directed to servo cylinder 22.

Figure 2:
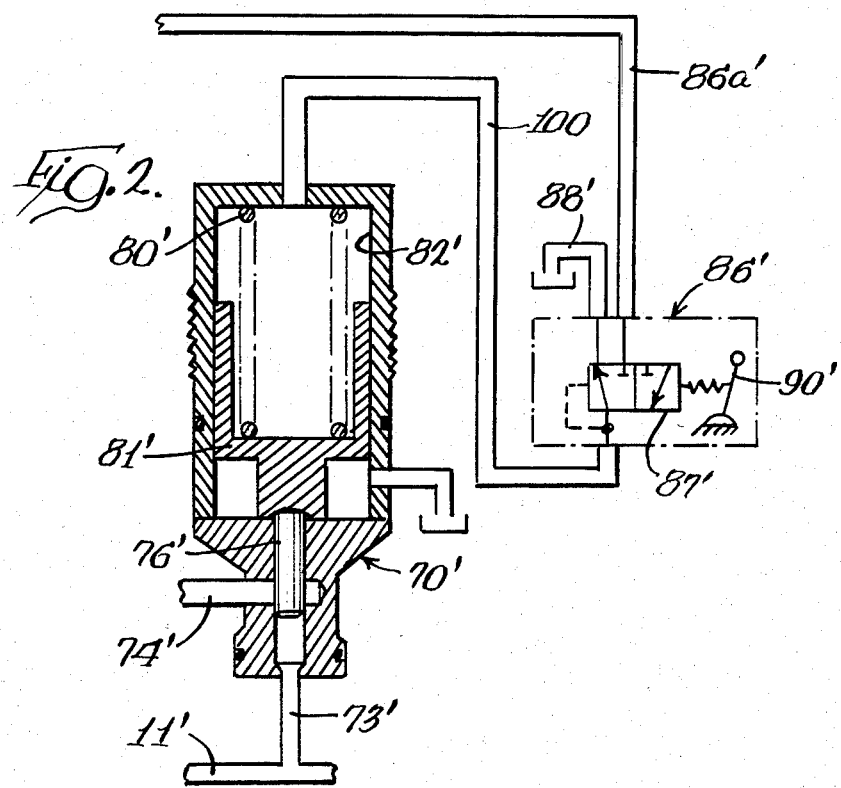
FIG. 2 is a fragmentary view of a part of the hydrostatic transmission shown in FIG. 1 and showing an alternate embodiment of the remotely variable pressure limiter valve.

An alternate embodiment is shown in FIG. 2 which primarily differs with respect to the action which occurs when there is no remotely-set control pressure. In the embodiment of FIG. 2, the control pressure acts as a force additive to that of the spring. Existence of a control pressure increases the set point at which the pressure limiter valve will open and, when there is no control pressure, the pressure limiter valve will open at a lower system pressure. In the embodiment of FIG. 2, the structure which is the same as that described in FIG. 1 has been given the same reference numeral with a prime affixed thereto.

The valve 87′ has a line 100 extending to an end of the chamber 82′ whereby a control pressure established by valve 87′ is directed to the upper side of the piston 81′ and the control pressure acting on the upper side of the piston creates a force in addition to the force of the spring 80′ acting to maintain the valve member 76′ in the position shown in FIG. 2 whereby communication between lines 73′ and 74′ is blocked. When system pressure in line 11′ acting on the sensing piston end of the valve member reaches a value sufficient to overcome the force of the control pressure on the spring 80′, the valve member moves to a position to open communication between lines 73′ and 74′ whereby system pressure can be directed to the servo cylinder 22. Without a control pressure, the valve member 76′ can be moved upwardly from the position shown in FIG. 2 by a lower value of system pressure and with the value of the control pressure being variable, the set point at which the pressure limiter valve will open can be variable.

The pressure limiter disclosed acts on only one side of a closed loop system. In some applications, there may be two such devices required. In addition to the pressure limiter associated with line 11 of the closed loop, there would be a pressure limiter connected to line 12 of the closed loop and to the line 110 extending between the servo cylinder 21 and the check valve 98. The pressure regulator 86 would provide a control pressure for establishing the set point for the added pressure limiter.

Control pressure which is applied to the pressure limiter valves 70 and 70′ through the control lines 85 and 100, respectively, is at relatively low pressure (charge pressure or less) and thus the lines are not subject to fatigue and other problems encountered when handling a high system pressure.

The areas of the pistons 81 and 81′ are large as compared to the area of the sensing piston end of the valve members 76 and 76′ whereby the relatively low control pressure can effectively establish the set point at which a high system pressure will open a pressure limiter valve.

I claim:

1. A remotely variable pressure limiter for a variable displacement pump having an adjustable swashplate and constructed to have pressure moments urging tha swashplate in a pump destroking direction, comprising, a pair of servo cylinders connected to said swashplate with one servo cylinder including a spring acting to urge the swashplate in the pump destroking direction, a displacement control valve having a pair of connections one to each of said servo cylinders, one of said connections providing connection of said one servo cylinder to a reduced case pressure through an orifice and the other connection providing for delivery of a displacement-setting pressure to the other of said servo cylinders, a pressure limiter valve for selectively connecting pump discharge pressure to said one servo cylinder to move the swashplate in a displacement reducing direction and having a movable valve member which moves from a first position to make said connection and which is urged away from said first position by pump discharge pressure, means for remotely setting the value of the discharge pressure which will move the valve member including a spring acting on the valve member, and a piston engaging said spring and acted upon by a remotely set control pressure to vary the force required to move the valve member, and a check valve communicating with said other servo cylinder to permit rapid discharge of fluid when pump discharge pressure is directed to said one servo cylinder.

2. In combination, a variable displacement pump having a pair of servo cylinders and a displacement control valve for controlling pump displacement, and a remotely variable pressure limiter for limiting pump discharge pressure comprising, pressure limiter valve means having a valve member positionable in response to pump discharge pressure and having a first position to block communication of pump discharge pressure to one of said servo cylinders and a second position to unblock said communication, means for remotely setting the pressure at which said valve member will move from said first position including a cylinder having a piston engageable with said valve member, a spring acting on said piston, and means for applying a control fluid pressure to said piston to modify the force exerted by the spring, said other of said servo cylinders being supplied with fluid under pressure to set the displacement of the pump, and a check valve communicating with said other servo cylinder to permit rapid discharge of fluid when pump discharge pressure is directed to said one servo cylinder.

3. A remotely variable pressure limiter for a variable displacement pump having an adjustable swashplate and constructed to have pressure moments urging the swashplate in a pump destroking direction, comprising, a pair of servo cylinders connected to said swashplate with one servo cylinder including a spring acting to urge the swashplate in the pump destroking direction, a displacement control valve having a pair of connections one to each of said servo cylinders, one of said connections providing connection of said one servo cylinder to a reduced case pressure through an orifice and the other connection providing for delivery of a displacement-setting pressure to the other of said servo cylinders, and a pressure limiter valve for selectively connecting pump discharge pressure to said one servo cylinder to move the swashplate in a displacement reducing direction and having a movable valve member, said pressure limiter valve having a valve chamber with only two fluid lines connected thereto with a first fluid connection to a pump outlet and a second fluid connection to said one servo cylinder, said movable valve member controlling communication between said fluid connections and being positionable in response to the value of the pump discharge pressure, means to vary the force at which the valve member will move in response to pump discharge pressure comprising a spring acting on the valve member and a piston engaging said spring and positionable in different positions in response to a control pressure applied thereto to vary the force of the spring, and a check valve communicating with said other servo cylinder to permit rapid discharge of fluid when pump discharge pressure is directed to said one servo cylinder.

* * * * *